Aug. 4, 1942.　　　F. K. BROWN　　　2,292,195
FASTENER
Filed July 3, 1940
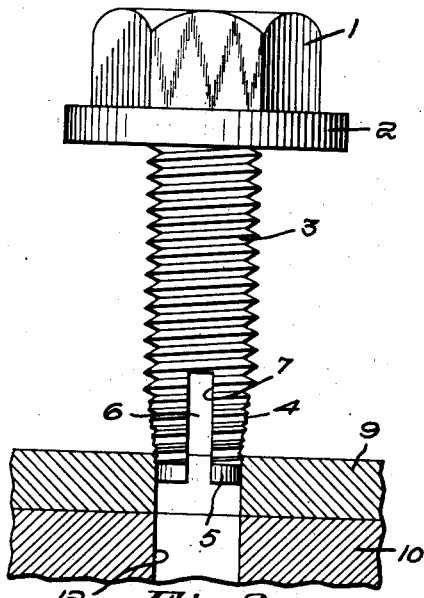
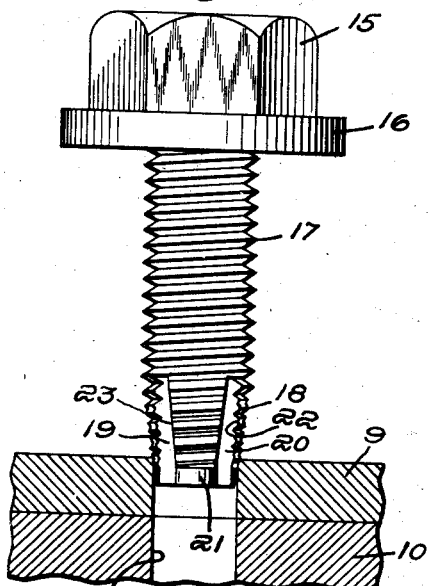
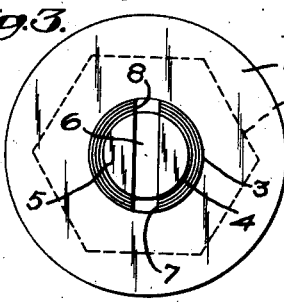
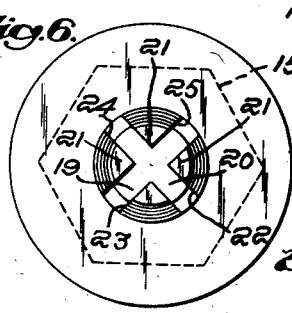
Inventor:
Frank K. Brown
by James R. Hodda
Attorney Patented Aug. 4, 1942

2,292,195

UNITED STATES PATENT OFFICE 2,292,195

FASTENER

Frank K. Brown, South Dartmouth, Mass., assignor to Continental Screw Company, New Bedford, Mass., a corporation of Massachusetts Application July 3, 1940, Serial No. 343,691

1 Claim. (Cl. 85—41)

My present invention is a novel type of self-tapping screw or fastener wherein the point or end of the fastener is adapted to cut or form a thread in a previously unthreaded opening in an article, or articles, to which the fastener is to be applied.

Heretofore, various type of self-tapping screws have been made and tried but all of these, as far as I am aware, have relied on a completed threaded tapered portion for entering the opening, aperture, recess, or bore to which the fastener is to be applied. Usually such prior threaded screws had a slightly tapered portion, or tapered threads, in the entering end for the tapping feature to form the thread for the subsequent holding threaded portion on the shank of the fastener.

Considerable difficulty has been experienced with such prior devices, as the tapered and threaded point or entering end of the fastener, because of the threads, is somewhat difficult to align properly with the opening to which the fastener is to be applied, the threaded edges and particularly the self-cutting tapping thread portions on the point or bevelled part tending to disalign the fastener in the opening in the work to which it is applied.

An important object of my present invention is to obviate the difficulties above briefly outlined and to provide a self-tapping fastener with a smooth pilot portion at the entering end followed by a self-cutting threaded portion and then a thread-holding shank portion in the fastener.

With the smooth pilot structure of my present invention, a self-tapping fastener can be readily applied to and fitted in correct alignment with the opening into which the fastener is to be driven, the smooth pilot portion automatically effecting a self-aligning and holding action between the work and the fastener. Thereafter, the fastener can be driven into the work, producing a self-cutting threading action, and initiating the threading operation correctly by the guiding operation of the smooth pilot portion.

A further feature of the present invention consists in forming a complete slotted opening transversely of the pilot and thread-cutting portions of my improved fastener, or of a plurality of such slots if desired. This produces a self-cutting edge adjacent the side of the slot thus formed relatively with the angle of the threads, and where a plurality, such for example as two slots at right-angles to each other, the thread-cutting portion is provided with four cutting corners, which insures quicker, easier, and more accurate tapping or self-threading cutting portions.

Furthermore, the forming of the slot, or slots, completely thru the pilot portion and the thread-cutting portions of my improved fastener enable the same to "spring" slightly inwardly during the self-cutting action or during the fitting of the pilot portion to the opening or aperture in which the fastener is first set and then driven, thus enabling a fastener with the same diameter to more accurately be driven in to openings of varying diameters.

I believe that my invention of a fastener of the kind described having a smooth pilot portion, a thread-cutting portion, and a thread-holding portion is distinctly new, and I wish to claim the same herein broadly. I believe that my fastener with one or more slots completely thru the pilot and thread-cutting portion is also a distinct novelty in this art, and I wish to claim the same herein broadly.

Referring to the drawing illustrating preferred embodiments of the present invention:

Fig. 1 is a side view illustrating my improved fastener with a smooth pilot fitted into an opening in two articles in which the fastener is to be driven;

Fig. 2 is a view illustrating the fastener partly driven, showing the thread-cutting operation and the "spring" afforded by the slotted part, which "spring" is somewhat overdrawn for clearness;

Fig. 3 is a plan view looking from the pilot end of the fastener;

Fig. 4 is a view illustrating my fastener with a plurality of slots formed thru the pilot and thread-cutting portions, with the pilot fitted in an aperture holding the screw in alignment therewith preparatory to the thread-cutting and driving action;

Fig. 5 is illustrative of the fastener driven partly thru showing the thread-cutting action with the pilot portion also "sprung" together somewhat; and Fig. 6 is a plan view from the pilot end.

As shown in the drawing, I have illustrated a typical fastener comprising a hexagonal head 1 and, if desired, a washer portion 2, the shank thread-holding part 3, the thread-cutting portion 4, and the smooth pilot portion 5. I form a cut, kerf, or slot 6 directly thru the pilot and thread-cutting portion, or at least a part of the thread-cutting portion, which extends entirely thru the same from one edge to the other, thus providing a pair of cutting edges 7 and 8 for the thread-cutting portion 4 as the same is driven into and thru the work.

As herein shown, I have illustrated a plurality of sheets of material 9 and 10 in which an aperture 12 has been formed to which the fastener is to be fitted. In applying the fastener to the opening 12, the smooth pilot portion 5 gives a self-aligning, fitting, and holding operation between the material thru which the opening 12 has been formed and the fastener. Thus the subsequent thread-cutting is effected more accurately and the correctness of alignment of the entire fastener relatively to the work to which it is applied is assured.

This smooth pilot-holding and aligning feature is also most important when the work is at an angle or upside down, as the fastener can be readily fitted and automatically held in proper alignment with the recess for the subsequent thread-cutting and further operation of driving the fastener home; whereas, formerly, the fastener having threads in contact with the walls of the opening 12 were difficult to align correctly and tended to disalign the fastener with the work.

In Figs. 4, 5, and 6 I have illustrated a somewhat modified construction wherein a plurality of slots are formed thru the pilot and thread-cutting portions. In this form, the fastener has a head 15, a washer portion 16, and if desired, a threaded shank 17, and a thread-cutting portion 18 formed into four sections by a pair of slots 19 and 20, crossing in the center of the axis of the fastener and opening at each end, thus dividing also the pilot portion 21 into four sections. Thus, the thread-cutting portion has four cutting edges, as indicated at 22, 23, 24, and 25.

With the double-slotted construction as shown in Figs. 4, 5, and 6, the pilot portions 21 as well as the thread-cutting portions 18 may also yield or "spring" considerably more for adjustment in the recess 12 and for exerting a yielding tension during the cutting operation. This spring or yielding action is overdrawn considerably in both Figs. 2 and 5 in order to emphasize this feature, although the metal of the fastener may, of course, be sufficiently rigid relatively with the work to which it is applied, viz., the plates 9 and 10, or equivalent so that the "springing" is relatively negligible.

I claim:

A self-tapping screw fastener of the kind described, having a cylindrical thread-holding portion adjacent the head, a tapered thread-cutting portion adjacent the pilot end, and a smooth surfaced pilot portion extending from and merging directly with the thread-cutting portion, together with a slot extending crosswise entirely thru both the pilot and the thread-cutting portions only, said slot being substantially greater in width than the height of the threads in said cutting portion to provide clearance and spring to both said thread-cutting and pilot portions.

FRANK K. BROWN.